(12) United States Patent
Chung et al.

(10) Patent No.: US 8,358,585 B2
(45) Date of Patent: Jan. 22, 2013

(54) METHOD FOR TRANSMITTING AND RECEIVING CHANNEL STATE INFORMATION PERIODICALLY OR APERIODICALLY

(75) Inventors: Jae Hoon Chung, Anyang-si (KR); Moon Il Lee, Anyang-si (KR); Yeong Hyeon Kwon, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 548 days.

(21) Appl. No.: 12/350,716

(22) Filed: Jan. 8, 2009

(65) Prior Publication Data

US 2009/0190528 A1 Jul. 30, 2009

Related U.S. Application Data

(60) Provisional application No. 61/019,843, filed on Jan. 8, 2008.

(30) Foreign Application Priority Data

Dec. 29, 2008 (KR) ........................ 10-2008-0135367

(51) Int. Cl.
*H04J 1/16* (2006.01)
(52) U.S. Cl. .................... 370/252; 370/278; 370/230
(58) Field of Classification Search .................. 370/328, 370/329, 331, 332, 333, 334, 252, 253
See application file for complete search history.

(56) References Cited

U.S. PATENT DOCUMENTS

| 7,907,677 B2 * | 3/2011 | Li et al. ........................ 375/267 |
| 2005/0083943 A1 * | 4/2005 | Lee et al. .................... 370/395.4 |
| 2005/0265436 A1 | 12/2005 | Suh et al. |
| 2005/0281226 A1 * | 12/2005 | Lee et al. ....................... 370/329 |
| 2007/0026808 A1 * | 2/2007 | Love et al. .................... 455/67.7 |
| 2007/0242770 A1 | 10/2007 | Kim et al. |
| 2007/0254595 A1 | 11/2007 | Yoon et al. |
| 2007/0254597 A1 | 11/2007 | Li et al. |
| 2008/0080635 A1 * | 4/2008 | Hugl et al. ..................... 375/267 |
| 2009/0059844 A1 * | 3/2009 | Ko et al. ........................ 370/328 |
| 2010/0035555 A1 * | 2/2010 | Bala et al. ..................... 455/63.1 |
| 2010/0260119 A1 | 10/2010 | Kishiyama et al. |
| 2010/0296472 A1 * | 11/2010 | Lee et al. ....................... 370/329 |
| 2011/0222411 A1 * | 9/2011 | Koskinen et al. ............. 370/328 |

FOREIGN PATENT DOCUMENTS

| CN | 1604663 A | 4/2005 |
| CN | 1708149 A | 12/2005 |
| JP | 2007-258110 A | 10/2007 |
| JP | 2009-89189 A | 4/2009 |
| KR | 10-2005-0078640 A | 8/2005 |

OTHER PUBLICATIONS

Ericsson, "Channel Feedback Format Selection", 3GPP TSG-RAN WG1 Meeting #51, R1-074854, URL, ftp.3gpp.org/tsg_ran/WG1_RL1/TSGR1_51/Docs/R1-074854/R1-074854, Korea, pp. 1-6, Nov. 5-9, 2007.
NTT DoCoMo, "On CQI Reporting in E-UTRA", 3GPP TSG RAN WG1 Meeting #50bis, 6.2.4., R1-074289, Shanghai, China, pp. 1-4, Oct. 8-12, 2007.

* cited by examiner

*Primary Examiner* — Kibrom T Hailu
*Assistant Examiner* — Dady Chery
(74) *Attorney, Agent, or Firm* — Birch, Stewart, Kolasch & Birch, LLP

(57) ABSTRACT

A method for transmitting and receiving channel state information (CSI) periodically and aperiodically is disclosed. The method for aperiodically transmitting channel state information (CSI) by a terminal includes receiving an indicator requesting a channel state information report of a downlink channel from a base station over a downlink control channel, and aperiodically transmitting the channel state information (CSI) to the base station over a physical uplink shared channel (PUSCH) upon receiving the indicator from the base station.

10 Claims, 3 Drawing Sheets

METHOD FOR TRANSMITTING AND RECEIVING CHANNEL STATE INFORMATION PERIODICALLY OR APERIODICALLY

CROSS-REFERENCE TO RELATED APPLICATIONS

This application claims the benefit of the U.S. Provisional Patent Application No. 61/019,843, filed on Jan. 8, 2008, which is hereby incorporated by reference as if fully set forth herein.

This application claims the benefit of the Korean Patent Application No. 10-2008-0135367, filed on Dec. 29, 2008, which is hereby incorporated by reference as if fully set forth herein.

BACKGROUND OF THE INVENTION

1. Field of the Invention

The present invention relates to a method for enabling a terminal to periodically and/or aperiodically report channel state information to a base station, and a method for enabling the base station to receive the channel state information, wherein it is assumed that the channel state information for use in a multi-antenna system (i.e., a Multiple-Input Multiple-Output (MIMO) system) includes a channel quality indicator (CQI), a preceding matrix index (PMI), and a rank indicator (RI).

2. Discussion of the Related Art

Generally, a multi-antenna technology (hereinafter referred to as an MIMO technology) will hereinafter be described in detail.

In brief, the MIMO technology is an abbreviation of the Multi-Input Multi-Output technology. The MIMO technology uses multiple transmission (Tx) antennas and multiple reception (Rx) antennas to improve the efficiency of transmission/reception (Tx/Rx) data, whereas a conventional art has generally used a single transmission (Tx) antenna and a single reception (Rx) antenna. In more detail, the MIMO technology is not dependent on a single antenna path to receive a single entire message, and completes the entire message by collecting a plurality of data fragments received via several antennas. As a result, the MIMO technology can increase a data transfer rate within a specific range, or can increase a system range at a specific data transfer rate.

FIG. 1 is a block diagram illustrating a conventional MIMO system.

If the number of antennas of a reception end and the number of antennas of a reception end are simultaneously increased as shown in FIG. 1, theoretical channel transmission capacity increases in proportion to the number of antennas in a different way from a conventional art in which only a transmitter or a receiver uses multiple antennas, such that a frequency efficiency can be greatly improved.

The MIMO technology can be classified into a spatial diversity scheme and a spatial multiplexing scheme. The spatial diversity scheme increases transmission reliability using symbols passing various channel paths. The spatial multiplexing scheme simultaneously transmits a plurality of data symbols via a plurality of Tx antennas, so that it increases a transfer rate of data. In addition, the combination of the spatial diversity scheme and the spatial multiplexing scheme has also been recently researched to properly acquire unique advantages of the two schemes.

Detailed descriptions of the spatial diversity scheme, the spatial multiplexing scheme, and the combination thereof will hereinafter be described in detail.

Firstly, the spatial diversity scheme will hereinafter be described. The spatial diversity scheme is classified into a space-time block code scheme and a space-time Trellis code scheme which simultaneously uses a diversity gain and a coding gain. Generally, a bit error ratio (BER) improvement performance and a code-generation degree of freedom of the space-time Trellis code scheme are superior to those of the space-time block code scheme, whereas the calculation complexity of the space-time block code scheme is superior to that of the space-time Trellis code scheme. A spatial diversity gain corresponds to the product or multiplication of the number of Tx antennas and the number of Rx antennas. In the meantime, if a space-time coding scheme is applied to a frequency domain instead of a time domain, this space-time coding scheme may also be considered to be a frequency-space coding scheme, and a coding scheme applied to this frequency-space coding scheme is equal to that of the space-time coding scheme.

Secondly, the spatial multiplexing scheme will hereinafter be described. The spatial multiplexing scheme is adapted to transmit different data streams via individual Tx antennas. In this case, a receiver may unavoidably generate mutual interference between data fragments which have been simultaneously transmitted from a transmitter. The receiver removes this mutual interference using a proper signal processing technique, so that it can receive the resultant data having no interference. In order to remove noise from the received data, a maximum likelihood receiver, a ZF receiver, a MMSE receiver, a D-BLAST, or a V-BLAST may be used. Specifically, if a transmission end is able to recognize channel information, a Singular Value Decomposition (SVD) scheme may be used to remove the noise.

Thirdly, the combination of the spatial diversity scheme and the spatial multiplexing scheme will hereinafter be described. Provided that only a spatial diversity gain is acquired, a performance-improvement gain is gradually saturated in proportion to an increasing diversity order. Otherwise, provided that only the spatial multiplexing gain is acquired, a transmission reliability of a radio frequency (RF) channel is gradually deteriorated. As a result, a variety of schemes capable of acquiring both the aforementioned two gains simultaneously while solving the above-mentioned problems have been intensively researched by many companies or developers, for example, a double-STTD scheme and a space-time BICM (STBICM) scheme.

In the meantime, a general communication system performs coding of transmission information of a transmission end using a forward error correction code, and transmits the coded information, so that channel errors can be corrected by a reception end. The reception end demodulates a received (Rx) signal, performs decoding of forward error correction code, and recovers transmission information. By the decoding process, errors of the Rx signal caused by the channel can be corrected.

Each of all forward error correction codes has a maximum-correctable limitation in a channel error correction. In other words, if a reception (Rx) signal has an error exceeding the limitation of a corresponding forward error correction code, a reception end is unable to decode the Rx signal into information having no error. Therefore, there is a need for the reception end to determine the presence or absence of an error in the decoded information. In this way, a specialized coding process for performing error detection is required, separately from the forward error correction coding process. Generally, a Cyclic Redundancy Check (CRC) code has been used as an error detection code.

The CRC method is an exemplary coding method for performing the error detection instead of the error correction. Generally, transmission information is coded by the CRC method, and then the forward error correction code is applied to the CRC-coded information. A single unit coded by the CRC and the forward error correction code is generally called a codeword. Respective codewords are mapped to streams corresponding to ranks, and the mapped result is transmitted, where the number of streams is equal to the number of ranks corresponding to independent channels of a MIMO communication system.

Meanwhile, in the above-mentioned MIMO system, a transmission end performs preceding of Tx data, and transmits the precoded Tx data, and a reception end receives signals using a preceding vector used by the transmission end.

The preceding vector for performing the above preceding is set to any one of preceding vectors which have been predefined as a codebook format in transmission/reception ends. In this case, a transmission scheme of the transmission end can be classified into an open-loop transmission method and a closed-loop transmission method according to specific information indicating whether or not the preceding vector of the transmission end requests feedback information from the reception end.

In case of the open-loop transmission method, the transmission end selects a preceding vector without using feedback information of the reception end, and transmits signals. Otherwise, in case of the closed-loop transmission method, the reception end indicates a specific preceding vector among predefined codebooks according to a reception end, and feeds back channel information associated with the specific preceding vector, such that the transmission end transmits signals using such a feedback signal.

In the meantime, in order to implement effective communication, there is a need for channel information to be notified along a feedback path, downlink channel information is uploaded to an uplink, and uplink channel information is downloaded to a downlink. The downlink or uplink channel information is represented by a channel information indicator (CQI), i.e., a channel quality indicator (CQI). This CQI can be generated by various methods. For example, a method for quantizing channel state information without any change and uploading the quantized channel state information, a method for calculating an SINR and uploading the calculated SINR, and a method for notifying a channel's actual application state as in a modulation coding scheme (MCS) can be used.

In this MIMO system, channel state information (CSI) to be notified to a base station by a terminal may include the above CQI, the preceding matrix index (PMI), and the rank indicator (RI) indicating the number of independent channels. This channel state information is periodically notified to a base station over a Physical Uplink Control Channel (PUCCH) and/or a Physical Uplink Shared Channel (PUSCH).

SUMMARY OF THE INVENTION

Accordingly, the present invention is directed to a method for transmitting and receiving channel state information periodically or aperiodically, that substantially obviates one or more problems due to limitations and disadvantages of the related art.

There are needed a method for allowing a terminal to periodically transmit channel state information to a base station, and a method for allowing the terminal to aperiodically transmit the channel state information to the base station upon receiving a request from the base station.

In order to solve the above-mentioned problems, an object of the present invention is to provide a method for allowing the terminal to effectively transmit channel state information aperiodically.

Also, if the channel state information is periodically transmitted, an error detection capability is insufficient for current PUCCH transmission, such that a space for inserting an error detection code used to supplement the insufficient error detection capability may encounter unexpected problems.

In order to solve the above-mentioned problems, another object of the present invention is to provide a method for effectively solving PUCCH channel capacity problems while the terminal periodically transmits channel state information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for aperiodically transmitting channel state information (CSI) by a terminal, the method includes: receiving an indicator requesting a channel state information report of a downlink channel from a base station over a downlink control channel; and aperiodically transmitting the channel state information (CSI) to the base station over a physical uplink shared channel (PUSCH) upon receiving the indicator from the base station.

The channel state information (CSI) may include at least one of a preceding matrix index (PMI), a channel quality indicator (CQI), and a rank indicator (RI).

The physical uplink shared channel (PUSCH) may attach a CRC to a transmission control signal in order to detect a CRC error from the transmission control signal, such that the resultant transmission control signal including the CRC may be transferred. It is assumed that the transmission control signal includes a CQI and a PMI transferred over a physical uplink shared channel (PUSCH). A rank indicator (RI) transferred over the physical uplink shared channel (PUSCH) may have no CRC, such that the resultant rank indicator (RI) having no CRC may be transferred.

The method further may include periodically transmitting the channel state information (CSI) to the base station over a physical uplink control channel (PUCCH).

The physical uplink control channel (PUCCH) may have an error detection capability weaker than that of the physical uplink shared channel (PUSCH).

The method may further includes, upon receiving the indicator requesting the channel state information report at a specific subframe, transmitting the channel state information (CSI) over the physical suplink shared channel (PUSCH) after a lapse of 4 subframes from the specific subframe.

The channel state information may include a wideband preceding matrix index and a subband preceding matrix index, in which if the subband preceding matrix index is transferred, a preceding matrix index for each subband is cyclically transmitted in an entire system band or is transferred from an upper layer higher than a physical layer according to a predetermined order.

In another aspect of the present invention, there is provided a method for periodically transmitting channel state information (CSI) by a terminal, the method including: transmitting channel quality information including both a channel quality indicator (CQI) and a preceding matrix index (PMI) to a base station; and transmitting a rank indicator (RI) to the base station, in which the channel quality information and the rank indicator (RI) are transferred over a physical uplink control channel (PUCCH) at different times.

The channel quality information may include wideband channel quality information and subband channel quality information, in which the wideband channel quality information and the subband channel quality information are transferred over the physical uplink control channel (PUCCH) at different times.

The rank indicator (RI) may have a transmission period, which is different from a transmission period of the channel quality information.

The transmission period of the rank indicator (RI) may be longer than the transmission period of the channel quality information.

The subband channel quality information may be transferred at a specific time between transmission times of two successive wideband channel quality information parts.

In another aspect of the present invention, there is provided a method for allowing a base station to aperiodically receive channel state information (CSI) from a terminal, the method including: transmitting an indicator requesting a channel state information report of a downlink channel over a downlink control channel; and aperiodically receiving a report of the channel state information (CSI) from the terminal over a physical uplink shared channel (PUSCH).

The channel state information may include at least one of a preceding matrix index (PMI), a channel quality indicator (CQI), and a rank indicator (RI), and the physical uplink shared channel (PUSCH) attaches a CRC to a transmission signal in order to detect a CRC error from the transmission signal, such that the resultant transmission control signal including the CRC is transferred.

The method further includes periodically receiving the channel state information (CSI) from the terminal over a physical uplink control channel (PUCCH).

The present invention may provide a method for allowing a terminal to aperiodically transmit channel state information to a base station upon receiving a request from the base station. In more detail, the base station prescribes an indicator for transmitting aperiodic channel state information to the terminal in a downlink control channel, such that aperiodic channel state information can be effectively transmitted. Transmission over a PUSCH is prescribed, such that the error detection capability of the base station can be guaranteed.

Also, the present invention transmits various channel state information transmitted over a PUCCH, for example, a wideband PMI/CQI, a subband PMI/CQI, and an RI at different times, resulting in a guarantee of PUCCH capacity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The following embodiments of the present invention may be modified into various formats, and the scope of the present invention is not limited to only the following embodiments and can also be applied to other examples.

For the convenience of description and better understanding of the present invention, the following detailed description will disclose a variety of embodiments and modifications of the present invention. However, those skilled in the art will readily understand and implement the embodiments and modifications of the present invention. In some cases, in order to prevent ambiguous concepts of the present invention from occurring, conventional devices or apparatus well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include a user equipment (UE), a mobile terminal (Mobile Terminal), and a mobile station (MS), and may also be called any one of them as necessary. Also, the base station may include a Node-B and an eNode-B, and may also be called either of them.

One embodiment of the present invention provides a method for allowing a terminal to effectively transmit channel state information aperiodically. Presently, channel state information including a CQI, a PMI and an RI may be periodically transferred from the terminal to the base station over the PUCCH.

Figure 1:
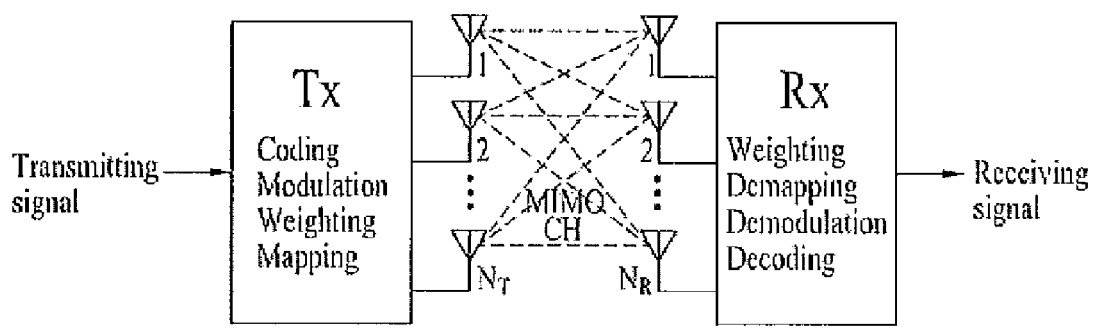
FIG. 1 is a block diagram illustrating a conventional MIMO system.
Figure 2:
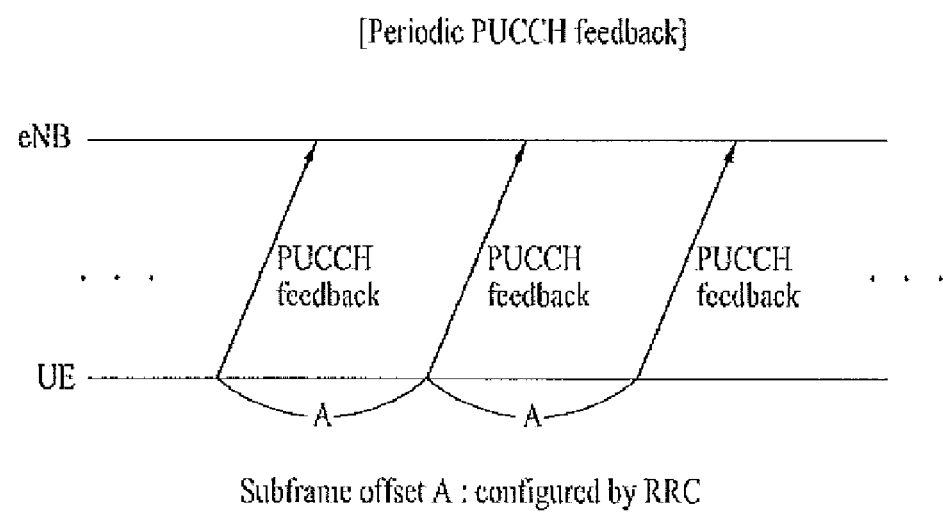
FIGS. 2 and 3 illustrate methods for allowing a terminal to periodically transmit channel state information to a base station.
Figure 3:
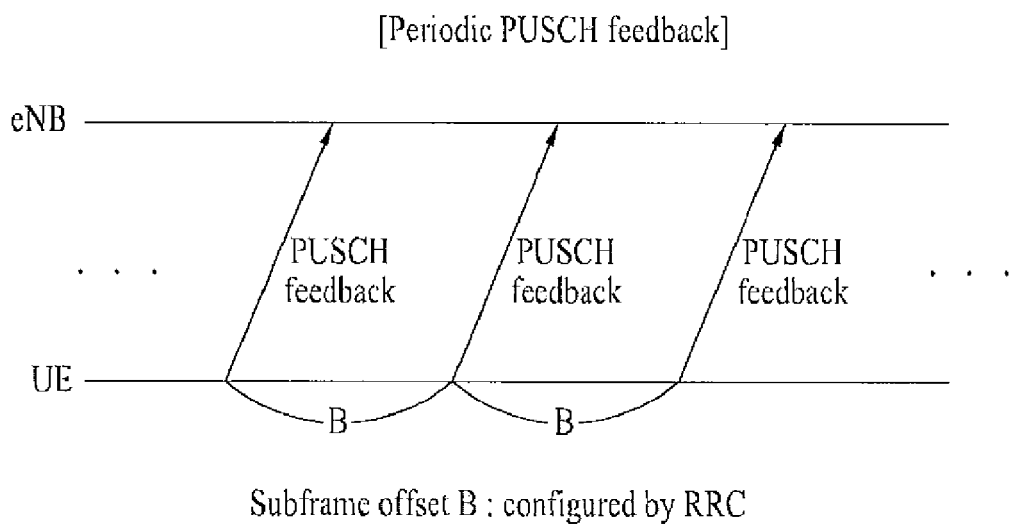

FIGS. 2 and 3 illustrate methods for allowing a terminal to periodically transmit channel state information to a base station.

Referring to FIGS. 2 and 3, a user equipment (UE) transmits a CQI, a PMI and an RI over a PUCCH and/or a PUSCH at intervals of a predetermined period, such that the UE need not receive a special grant signal for transmitting channel state information from the base station. The user equipment (UE) feeds back channel state information (CQI, PMI, and RI) over a PUCCH or PUSCH at intervals of a specific period (e.g., A frame under PUCCH transmission or a B frame under PUSCH transmission) constructed by an upper layer (e.g., an RRC layer).

Generally, due to the limitation of given capacity, the PUCCH signal is transmitted under the condition that there is no additional error detection code such as a CRC. Also, channel state information is transferred over a PUSCH due to the limitation of PUCCH capacity. In case of the PUSCH, this channel state information includes an error detection code such as a CRC, such that the resultant channel state information is transmitted over the PUSCH.

However, in some cases, there is needed a specific procedure for a base station to report channel state information to a user equipment (UE) at a specific time, separately from another procedure for allowing the base station to periodically report the channel state information. If a channel state information transmission event (i.e., eNB triggered CSI reporting event) induced by the base station occurs, there is a need for the base station to inform the user equipment (UE) of the eNB triggered CSI reporting event over a downlink control channel by an indicator. Therefore, scheduling information for an uplink channel can be carried out, and it is more preferable for an uplink grant (UL Grant) signal for a PUSCH to be carried out as described above. There is no need for the above-mentioned indicator to have a long length, such that an uplink channel information transmission request such as a CQI report request may be transferred to the user equipment (UE) by a signaling process of one bit. In case of applying an aperiodic channel state report scheme to a PUSCH-based channel state report scheme except for a PUCCH-based periodic channel state information report scheme in a method for reporting channel state information such as a CQI, a PMI, or an RI, in order to add an indication function of at least one channel state information requested from among several channel state information including the above three channel state information, a signaling process of N bits (where N≧2) instead of one bit may be contained in an uplink acknowledgement (ACK) signal for the PUSCH.

In the meantime, an error detection capability of the PUCCH may be less than that of the PUSCH as described above. Therefore, channel state information aperiodically reported by the user equipment (UE) may be transferred over the PUSCH capable of detecting CRC errors. As a result, the base station is able to detect Rx errors of the CQI, PMI, and RI, and is able to aperiodically acquire channel state information.

Channel state information transferred by the user equipment (UE) may be either wideband channel state information of all system bands or subband channel state information of an arbitrary frequency band contained in an overall system band. In case of transferring the subband channel state information (e.g., subband PMI), each subband PMI may be cyclically transferred in an overall system band, or may also be transferred over an upper layer according to a predetermined order.

Figure 4:
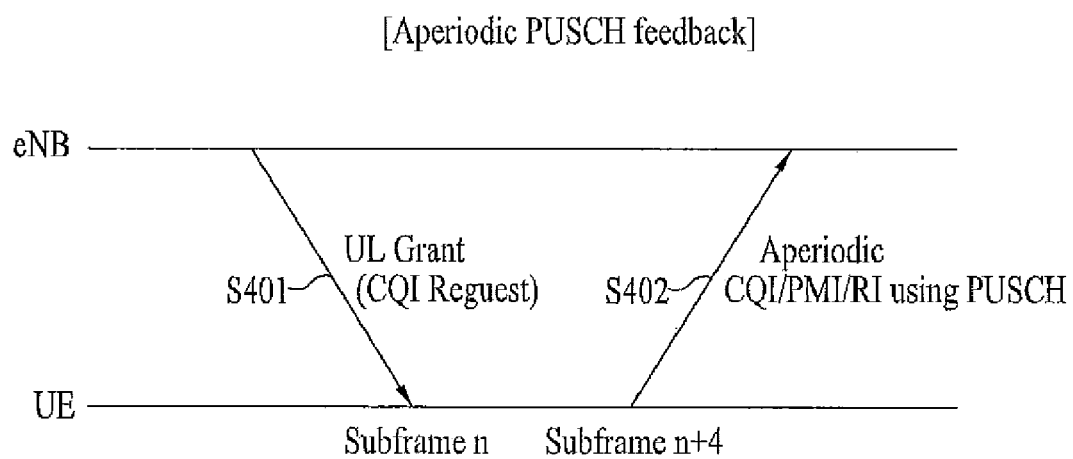
FIG. 4 is a conceptual diagram illustrating a method for allowing a terminal to aperiodically transmit channel state information over a PUSCH according to the present invention.

FIG. 4 is a conceptual diagram illustrating a method for allowing the user equipment (UE) to aperiodically transmit channel state information over a PUSCH according to the present invention.

Referring to FIG. 4, the user equipment (UE) is able to receive an indicator (indicator of 1 bit or N bits) requesting aperiodic transmission of channel state information from a base station over a downlink control channel at step S401. The indicator received at the step S401 may be used as an UL Grant signal. For the convenience of description, this indicator may hereinafter be referred to as a 'CQI Request' having a length of 1 bit. However, the CQI Request may have more bits to indicate whether subband channel state information is requested, as well as to inform the UE of additional information such as a subband position.

In the meantime, the user equipment (UE) having received the CQI Request signal as described above answers the CQI Request signal after the lapse of a predetermined time, such that it is able to transfer aperiodic channel state information such as CQI/PMI/RI over a PUSCH at step S402. Preferably, if the UE receives the CQI Request at the N-th subframe, it is able to transmit CQI/PMI/RI over the PUSCH to answer the CQI Request at the (n+4)-th subframe.

PUSCH may further include a CRC for detecting errors of a Tx signal, such that the resultant PUSCH may be transferred. So, the base station having received aperiodic channel state information determines the presence or absence of errors in channel state information received from the user equipment (UE), such that the determined result may be notified as confirmation information to the user equipment (UE). In this case, in association with all categories of channel state information transferred over the PUSCH, the CRC may be attached to channel state information of some categories according to a control information multiplexing scheme, an amount of information, and a requested reliability, such that the CRC-attached channel state information may be transferred. Specifically, confirmation information, indicating that the latest PMI reported from the UE to the base station has been used by the base station, may be referred to as PMI confirmation information.

In the meantime, in case of using PMI confirmation information in a downlink control channel, it is very important for the base station to detect errors in a subband PMI, a wideband PMI decided as either a designated frequency area or a total system band, and a rank information feedback.

Therefore, if the number of bits of control information (CQI, PMI, and/or RI) fed back over an arbitrary PUCCH is less than a maximum number of transmittable information bits which satisfy a QoS requested by the PUCCH in an arbitrary feedback event (i.e., if there is a redundant space in transmission bits capable of satisfying a QoS designated on the PUCCH without using an additional addition process), it is preferable for a specific code for strengthening an error detection capability to be inserted into the PUCCH. For example, this specific code may be a parity check code (e.g., even/odd parity, Hamming code). By this parity check code, an error detection capability based on a syndrome check of an algebraic code-based coding of the PUCCH can be assigned. But, the error detection capability based on the aforementioned algebraic code-based coding may be damaged by length adaptation for a code sequence. Therefore, additional error detection codes may be inserted into the PUCCH, such that it is preferable that the error detection capability is strengthened.

If the number of bits of control information (CQI, PMI, and/or RI) fed back over an arbitrary PUCCH in an arbitrary feedback event is higher than a maximum number of transmittable information bits which satisfy a QoS requested by the PUCCH (i.e., if any redundant bit capable of satisfying a QoS requested on the PUCCH does not exist), the insertion of additional error detection codes or the strengthening of arbitrary error detection capability may have unexpected difficulty.

Therefore, in order to always provide the error detection capability of a PUCCH control information feedback, it is preferable that the control information be fed back with a prescribed margin to prepare for the maximum number of control information bits which satisfy a QoS in all PUCCH transmissions simultaneously while being fed back.

Therefore, if channel state information is periodically transferred over the PUCCH, one embodiment of the present invention provides a method for transferring CQI/PMI information and RI information at different times. Also, if the wideband CQI/PMI and the subband CQI/PMI are simultaneously transmitted, it is preferable that the wideband CQI/PMI and the subband CQI/PMI be transmitted at different times. Transmitting the wideband CQI/PMI, the subband CQI/PMI, and the RI at different times may be designated to have periods of different lengths in view of individual information which is periodically transmitted over the PUCCH, or the above transmitting may have the same period whereas it has different transmission times, in such a way that the aforementioned transmitting may be implemented.

Figure 5:
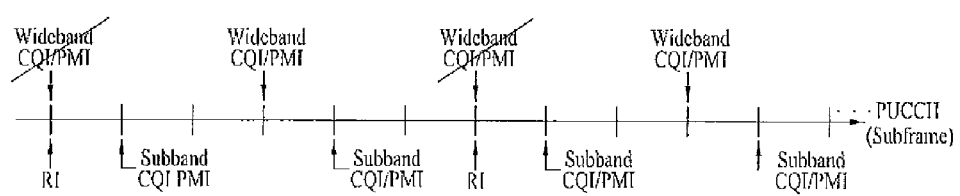
FIG. 5 is a conceptual diagram illustrating a method for periodically transmitting a wideband CQI/PMI, a subband CQI/PMI, and an RI over a PUCCH according to the present invention.

FIG. 5 is a conceptual diagram illustrating a method for periodically transmitting a wideband CQI/PMI, a subband CQI/PMI, and an RI over a PUCCH according to the present invention.

Referring to FIG. 5, if the wideband CQI/PMI and the RI are simultaneously transmitted, the wideband CQI/PMI and the RI must be transferred at different times according to this embodiment of the present invention. As can be seen from FIG. 5, it is assumed that the wideband CQI/PMI and the subband CQI/PMI are transferred via different subframes contained in the PUCCH. For example, if the wideband CQI/PMI is transmitted at intervals of a 3n subframe, it is preferable that the RI is transmitted with a period longer than a period corresponding to the subframe of 3n. If the RI also needs to be transmitted at a transmission time of the wideband CQI/PMI, it is assumed that the RI having a longer period is transmitted.

Also, it is assumed that the wideband CQI/PMI, the subband CQI/PMI, and the RI are simultaneously transmitted. As can be seen from FIG. 5, the subband CQI/PMI is transmitted at a specific time between two successive wideband CQI/PMI transmission times, and it is assumed that each transmission is periodically carried out.

It should be noted that the timing relationship in periodic transmission among the wideband CQI/PMI, the subband CQI/PMI, and the RI has been disclosed for only illustrative purposes, and a detailed timing relationship of them may be designed according to different requirements of a system.

As shown in the above-mentioned embodiment, the CQI/PMI and RI, the wideband CQI/PMI, and the subband CQI/PMI and RI are transmitted via different subframes of the PUCCH, such that a capacity space capable of increasing the error detection throughput can be easily detected from the PUCCH.

In the meantime, in order to simultaneously provide an error detection capability and a length adaptation capability of a code sequence during an algebraic code-based coding process when the CQI/PMI and the RI are transmitted according to another embodiment, this embodiment may configure a coding process using a specific pattern for enhancing the error detection capability in case of a permutation for a length matching or a puncturing process.

Also, if there are different QoS requirements (i.e., requirements to prepare for errors) in heterogeneous control information, or if there is needed to increase the probability of detecting individual control information (e.g., there is needed to increase the probability of recovering one of two information when an error has occurred), an additional coding for each information may be carried out and this coded result may be then joint-coded, resulting in the implementation of a total coding process.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims.

Thus, it is intended that the present invention covers the modifications and variations of this invention provided they come within the scope of the appended claims and their equivalents.

Therefore, the present invention is not limited to only the above-mentioned embodiments, but can be applied to other examples which can satisfy the above principles and new characteristics of the present invention.

As apparent from the above description, the present invention can be applied to a variety of wireless communication systems. Specifically, the above-mentioned embodiments can be readily applied to a 3GPP LTE system and a 3GPP LTE-A system acting as a new version of the 3GPP LTE system, and the scope or spirit of the present invention is not limited to only the 3GPP LTE system and the 3GPP LTE-A system but can also be applied to a variety of wireless communication systems which allow the user equipment (UE) to periodically or aperiodically transmit channel state information to the base station.

What is claimed is:

1. A method for aperiodically transmitting channel state information (CSI) by a terminal, the method comprising:
   receiving an indicator requesting a channel state information report of a downlink channel from a base station over a downlink control channel; and
   aperiodically transmitting the channel state information (CSI) to the base station over a physical uplink shared channel (PUSCH) in subframe n+k, upon receiving the indicator from the base station in subframe n, wherein k is a predetermined number of subframes,
   wherein a Cyclic Redundancy Check (CRC) is attached to a transmission control signal including the channel state information (CSI), in order to detect a CRC error from the transmission control signal, such that the transmission control signal including the CRC is transferred over the PUSCH.

2. The method according to claim 1, wherein the channel state information (CSI) includes at least one of a precoding matrix index (PMI), a channel quality indicator (CQI), and a rank indicator (RI).

3. The method according to claim 1, wherein the CRC is attached to the transmission control signal including the channel state information (CSI) when the channel state information (CSI) falls within a category defined based on at least one of
   a control information multiplexing scheme,
   an amount of information of the CSI, and
   a requested reliability.

4. The method according to claim 1, further comprising:
   periodically transmitting the channel state information (CSI) to the base station over a physical uplink control channel (PUCCH).

5. The method according to claim 4, wherein the physical uplink control channel (PUCCH) has an error detection capability weaker than that of the physical uplink shared channel (PUSCH).

6. The method according to claim 1, wherein k=4.

7. The method according to claim 1, wherein the channel state information includes a wideband precoding matrix index and a subband precoding matrix index, in which
   if the subband precoding matrix index is transferred, a precoding matrix index for each subband is cyclically transmitted in an entire system band or is transferred according to a predetermined order configured by an upper layer higher than a physical layer.

8. A method for allowing a base station to aperiodically receive channel state information (CSI) from a terminal, the method comprising:
- transmitting an indicator requesting a channel state information report of a downlink channel to the terminal over a downlink control channel in subframe n; and
- aperiodically receiving a report of the channel state information (CSI) from the terminal over a physical uplink shared channel (PUSCH) in subframe n+k, wherein k is a predetermined number of subframes,
- wherein a Cyclic Redundancy Check (CRC) is attached to a transmission control signal including the channel state information (CSI), in order to detect a CRC error from the transmission control signal, such that the transmission control signal including the CRC is transferred over the PUSCH.

9. The method according to claim 8, wherein the CRC is attached to the transmission control signal including the channel state information (CSI) when the channel state information (CSI) falls within a category defined based on at least one of
- a control information multiplexing scheme,
- an amount of information of the CSI, and
- a requested reliability.

10. The method according to claim 8, further comprising:
- periodically receiving the channel state information (CSI) from the terminal over a physical uplink control channel (PUCCH).

\* \* \* \* \*